(12) United States Patent
Williams et al.

(10) Patent No.: US 11,811,616 B1
(45) Date of Patent: *Nov. 7, 2023

(54) SYSTEM AND METHOD FOR PREDICTING ANOMALOUS REQUESTS AND PREVENTING ANOMALOUS INTERACTIONS IN A NETWORK

(71) Applicant: Bank of America Corporation, Charlotte, NC (US)

(72) Inventors: Stephen Jack Williams, Charlotte, NC (US); Richard Scot, Huntersville, NC (US); Rebecca Lynn Pietro, Fort Mill, SC (US); John Shelton, Charlotte, NC (US); Abelardo Espinoza, Locust, NC (US); Nathan Alexander Dalpini, McKinney, TX (US); Vani Reddy Nareddy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,654

(22) Filed: Feb. 23, 2023

Related U.S. Application Data

(63) Continuation of application No. 17/854,365, filed on Jun. 30, 2022, now Pat. No. 11,658,881.

(51) Int. Cl.
*H04L 41/16* (2022.01)
*H04L 67/306* (2022.01)
(Continued)

(52) U.S. Cl.
CPC ........... *H04L 41/16* (2013.01); *H04L 43/02* (2013.01); *H04L 43/04* (2013.01); *H04L 43/062* (2013.01); *H04L 67/306* (2013.01)

(58) Field of Classification Search
None
See application file for complete search history.

(56) References Cited

U.S. PATENT DOCUMENTS 7,263,506 B2 * 8/2007 Lee .................... G06Q 20/4016
705/318
10,084,805 B2 9/2018 Nadolski et al.
(Continued)

OTHER PUBLICATIONS

Qiang et al., "RMT-Net: Reject-Aware Multi-Task Network for Modeling Missing-Not-At-Random Data in Financial Credit Scoring", May 30, 2022, IEEE, IEEE Transactions on Knowledge and Data Engineering (vol. 35, Issue: 7, pp. 7427-7439) (Year: 2022).*

*Primary Examiner* — Davoud A Zand

(57) ABSTRACT

A system for predicting an anomalous request comprises a processor associated with a server. The processor is configured to parse a user profile from a plurality of user profiles to generate a first set of data objects associated with the first user profile. The processor is configured to compare the first set of the data objects to approved data and audit data to generate a second set of data objects with a set of anomalous data indicators for the first user profile. The processor is further configured to process the second set of the data objects through an anomaly learning model to determine a predictive degree of approval associated with the user profile. The processor is further configured to determine to approve, flag or disapprove the user profile based on the predictive degree of approval. The processor is further configured to assign a profile indicator to the user profile.

20 Claims, 3 Drawing Sheets

(51) Int. Cl.
  *H04L 43/02* (2022.01)
  *H04L 43/062* (2022.01)
  *H04L 43/04* (2022.01)

(56) References Cited

U.S. PATENT DOCUMENTS

| | | | |
|---|---|---|---|
| 10,187,413 | B2 | 1/2019 | Vasseur et al. |
| 10,218,726 | B2 | 2/2019 | Vasseur et al. |
| 10,419,468 | B2 | 9/2019 | Glatfelter et al. |
| 11,106,789 | B2 | 8/2021 | Kraus et al. |
| 11,165,800 | B2 | 11/2021 | Thampy |
| 11,178,182 | B2 | 11/2021 | Saxena et al. |
| 11,310,257 | B2 | 4/2022 | Argoeti et al. |
| 2018/0176156 | A1* | 6/2018 | Downey ................. H04L 67/55 |
| 2018/0276256 | A1* | 9/2018 | Sarkar ................. G06F 18/2321 |
| 2018/0302300 | A1* | 10/2018 | Moeller-Bertram ........................ A61B 5/7264 |
| 2018/0376306 | A1 | 12/2018 | Ramalho De Oliveira |
| 2019/0124117 | A1 | 4/2019 | Swafford |
| 2019/0272775 | A1* | 9/2019 | Noble ..................... G09B 5/12 |
| 2019/0320038 | A1* | 10/2019 | Walsh ..................... H04L 65/65 |
| 2020/0090027 | A1 | 3/2020 | Oliner et al. |
| 2020/0134489 | A1 | 4/2020 | Achin et al. |
| 2020/0153855 | A1 | 5/2020 | Kirti et al. |
| 2020/0257992 | A1 | 8/2020 | Achin et al. |
| 2020/0329066 | A1 | 10/2020 | Kirti et al. |
| 2021/0326782 | A1 | 10/2021 | Achin et al. |
| 2021/0365835 | A1 | 11/2021 | Baumard |
| 2022/0014547 | A1 | 1/2022 | Hasan |

* cited by examiner

SYSTEM AND METHOD FOR PREDICTING ANOMALOUS REQUESTS AND PREVENTING ANOMALOUS INTERACTIONS IN A NETWORK

CROSS-REFERENCE TO RELATED APPLICATION

The application is a continuation of U.S. patent application Ser. No. 17/854,365, filed Jun. 30, 2022, by Stephen Jack Williams, and entitled "System and method for predicting anomalous requests and preventing anomalous interactions in a network," which is incorporated herein by reference.

TECHNICAL FIELD

The present disclosure relates generally to network communications and information security, and more specifically to a system and method for predicting anomalous requests and preventing anomalous interactions in a network.

BACKGROUND

Organization entities often learn from third-party reporting parties that their names, emails and/or private information are actively utilized to conduct anomalous interactions or communications after anomalous actions had occurred. It is a complicated process to detect actions of anomalous or spoofed requests for creating user profiles or spoofing a user to gain access to their personal information and to perform anomalous and malicious activities on organization entities or other users in a network. By analyzing manipulated communications or anomalous email domains, a third-party reporting party may believe an unauthorized user account is opened using Non-Public Corporate Information (NPCI), thus creating a request from the reporting party to the organizations to share information that is not able to be disclosed due to organization privacy regulations. Such processes are difficult to perform. Current information security and anomaly detecting technologies are not configured to provide a reliable and efficient solution to predict anomalous requests and prevent anomalous interactions with the organization entity and other users.

SUMMARY

Current technology is not configured to provide a reliable and efficient solution to predict anomalous requests and prevent anomalous interactions with organization entities in a network. The system described in the present disclosure is particularly integrated into a practical application and provides technical solutions to the technical problems of previous systems.

In one embodiment, the system for predicting anomalous requests and preventing anomalous interactions in a network comprises a processor and a memory. The processor receives a first user profile from a plurality of user profiles received from users and stored in the memory. The processor parses the first user profile to generate a first set of data objects. The processor compares the first set of the data objects to approved data retrieved from a first database to determine a first set of anomalous data indicators. The approved data is associated with one or more user profiles that are currently approved by the entity. The first set of the anomalous data indicators are each indicative of a first anomalous relevance measure between the first set of the data objects and the approved data. The processor compares the first set of the data objects to audit data retrieved from a second database to determine a second set of anomalous data indicators. The audit data is associated with one or more user profiles registered with one or more third party sources. The second set of the anomalous data indicators are each indicative of a second anomalous relevance measure between the first set of the data objects and the audit data. The processor compares the first set of the data objects to disapproved data retrieved from a third database to determine a third set of anomalous data indicators. The disapproved data is associated with anomalous data identified by one or more third party sources. The third set of the anomalous data indicators are each indicative of a third anomalous relevance measure between the first set of the data objects and the disapproved data. The processor generates a second set of data objects associated with the first user profile. The second set of the data objects comprises a first set of the anomalous data indicators, the second set of the anomalous data indicators, the third set of the anomalous data indicators and the first set of the data objects. The processor processes the second set of the data objects through an anomaly learning model to determine a predictive degree of approval associated with the first user profile. The processor determines to approve, flag, or disapprove the first user profile based on the predictive degree of approval. The processor assigns a profile indicator to the first user profile through an evaluation process. The profile indicator is one of an approval indicator, a flag indicator, and a disapproval indicator.

In one embodiment, the processor determines whether the predictive degree of approval is above an approval threshold, in a range between the approval threshold and a disapproval threshold, or below the disapproval threshold. The processor determines to approve the first user profile and assigns an approval indicator to the first user profile in response to determining that the predictive degree of approval is above the approval threshold. The processor determines to flag the first user profile and assigns a flag indicator to the first user profile in response to determining that the predictive degree of approval is in a range between the approval threshold and the disapproval threshold. The processor determines to disapprove the first user profile and assigns a disapproval indicator to the first user profile in response to determining that the predictive degree of approval is below the disapproval threshold. In one embodiment, the processor trains the anomaly learning model with the plurality of training datasets based on the evaluated historical user profiles. The processor updates a plurality of training datasets with the second set of the data objects and a profile indicator associated with each evaluated user profile from the plurality user profiles. The processor retrains the anomaly learning model with the plurality of the updated training datasets for predicting anomalous requests more accurately in the network.

The system described in the present disclosure provides technical solutions to solve the technical problems of the previous systems. For example, the anomaly learning model and other software models or modules may be integrated into a software application associated with a server to process user requests for creating user profiles, predicting anomaly requests, and further preventing anomalous interactions in the network in real time.

The disclosed system provides several technical advantages that overcome the previously discussed technical problems. The disclosed system is related to an information security server that provides a practical application that improves the information security of the computer system by using anomaly learning technology to predict anomalous requests for accessing a server associated with an organization entity. This process provides a technical advantage that increases information security because it provides a fast and effective way to predict whether a request to create a user profile is anomalous before creating a user account and authorizing the user to access the server. This process may be employed to authenticate and validate the request before allowing a requesting entity to perform any kind of actions or interactions in a computer system. In addition, this process provides information security to the overall computer system since it prevents anomalous interactions from spoofing users or entities within the network. Improving information security for the computer system also improves the underlying network and devices within the computer network. For example, when a data exfiltration attack associated with an anomalous request occurs, there is an increase in the number of network resources and bandwidth that are involved and consumed which reduces the throughput of the network. By preventing anomalous communications or data exfiltration attacks, the computer system can prevent any unnecessary increases in the number of network resources and bandwidth that are consumed that would otherwise negatively impact on information security of the organization entity and the throughput of the computer system. For example, by predicting and identifying anomalous requests, flagging, or disapproving requests, the anomalous interactions can be prevented earlier before creating the user profile and granting an access to the server of the organization entity compared to the current technology. Thus, the network communication bandwidth among the computer systems is not wasted and the disclosed processes improve the operation of the computer network system overall.

As such, the disclosed system may improve the current anomalous request prediction and verification process to prevent anomalous interactions by processing user profiles with data retrieved from one or more third party sources in a computer network. Accordingly, the disclosed system may be integrated into a practical application of processing a great of amount of user profiles and requests simultaneously and improving memory storage capacity utilization for predicting and identifying anomalous requests that would otherwise be spent using the current technology. For example, by predicting and identifying anomalous requests for creating user profiles, the disclosed system may report the server of the organization entity to approve and create user profiles, report alerts to the server by flagging the user profiles, and disapprove the user requests, that led to preventing anomalous interactions quickly and efficiently in the network.

The disclosed system may further be integrated into an additional practical application of improving the underlying operations of computer systems in a computer network that are tasked to carry out operations to grant a permission to create a user profile, access the user profile and retrieve related information from the user profile. For example, using the current technology where the anomalous requests have remained undetected and approved, the computer systems in the computer network continue to communicate with other computer systems which lead to more anomalous interactions reported by the computer systems. This leads the processors and memories of the computer system to have to process anomalous interactions, which leads to insecurity actions and data loss. The disclosed system may improve network security between the computer systems of the computer network and improve information security and data loss prevention.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
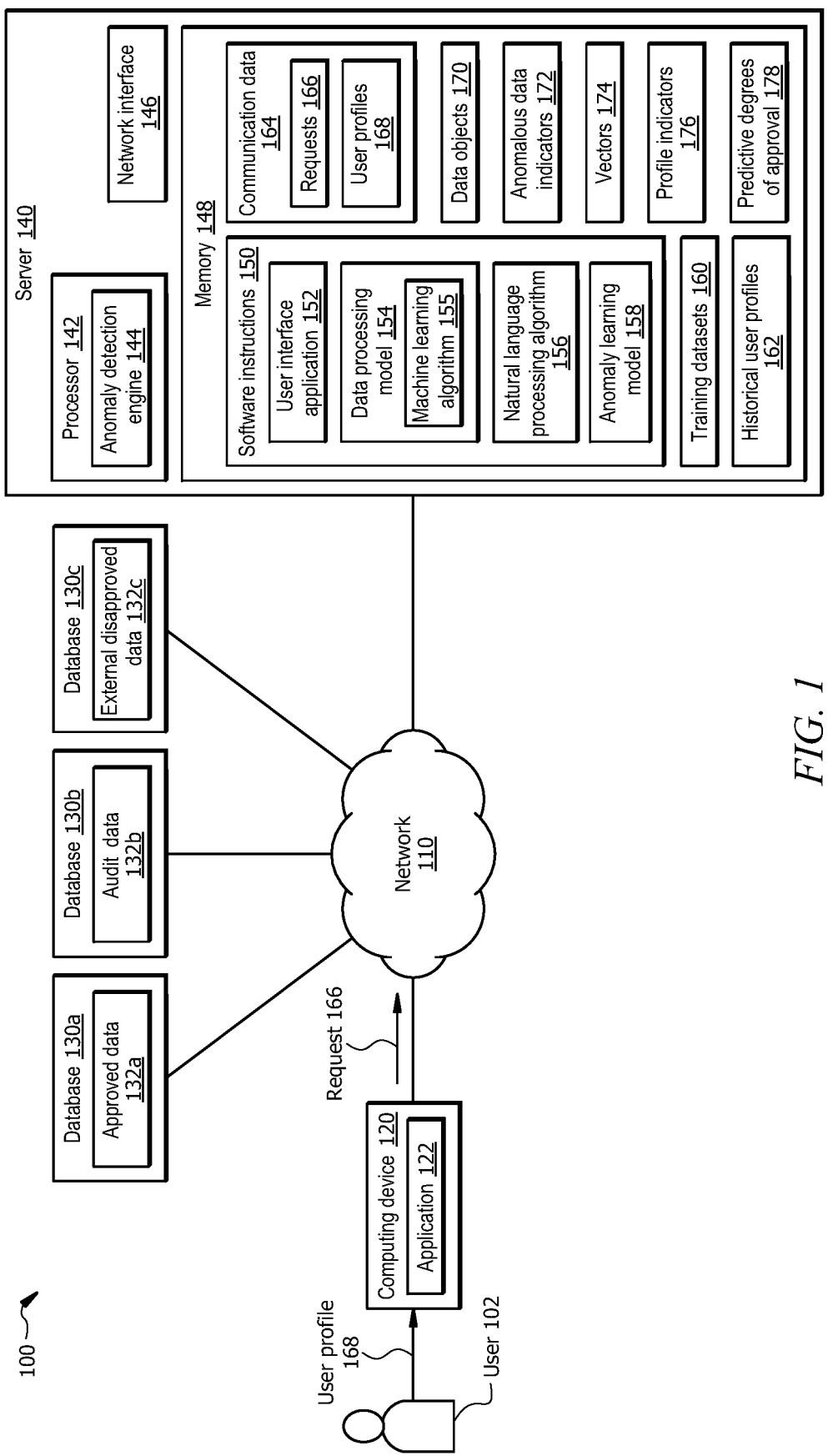
FIG. 1 illustrates an embodiment of a system configured to predict an anomalous request according to an illustrative embodiment of the present disclosure.
Figure 2A:
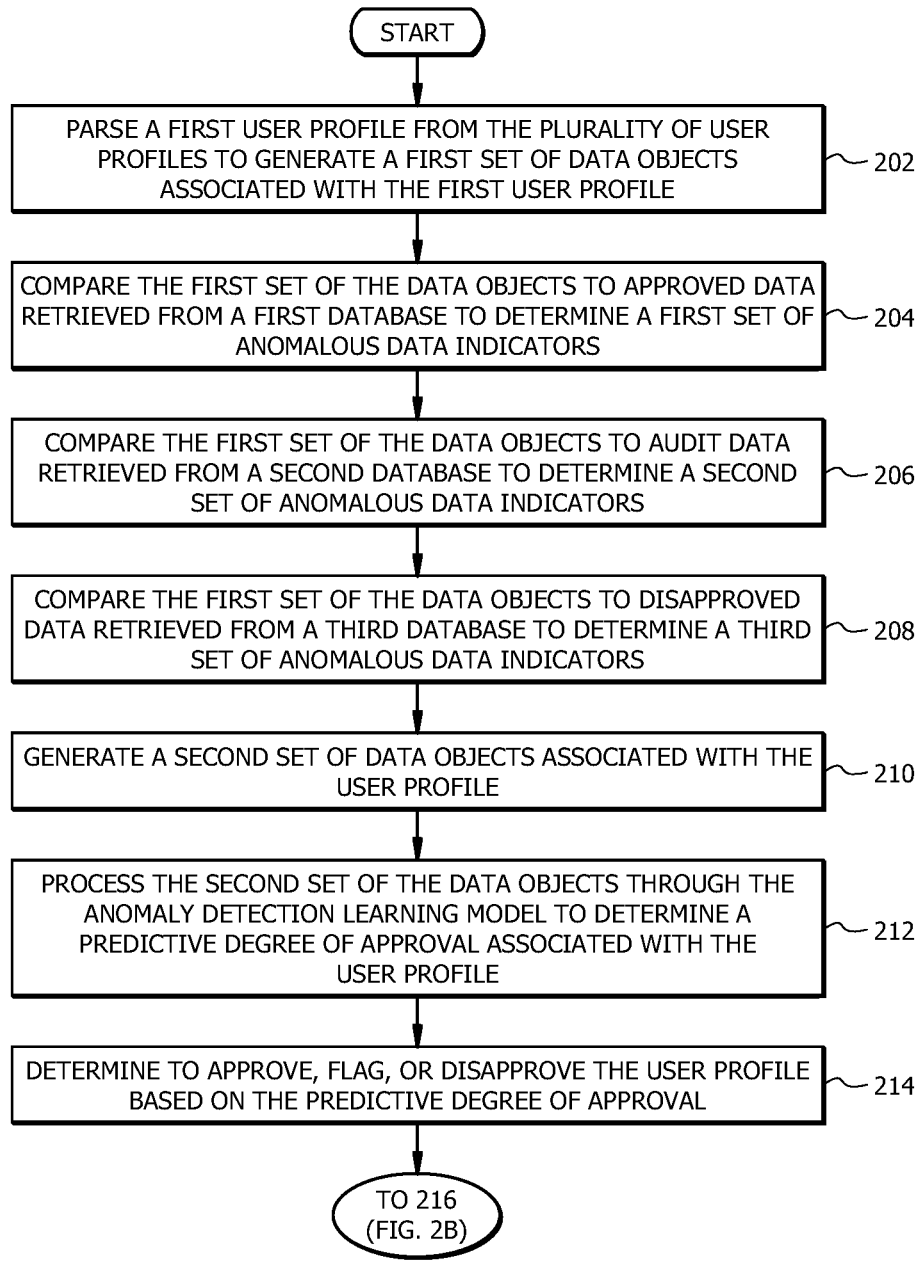
FIG. 2A illustrates an example operational flow of a method for processing user profiles and predicting anomalous requests.
Figure 2B:
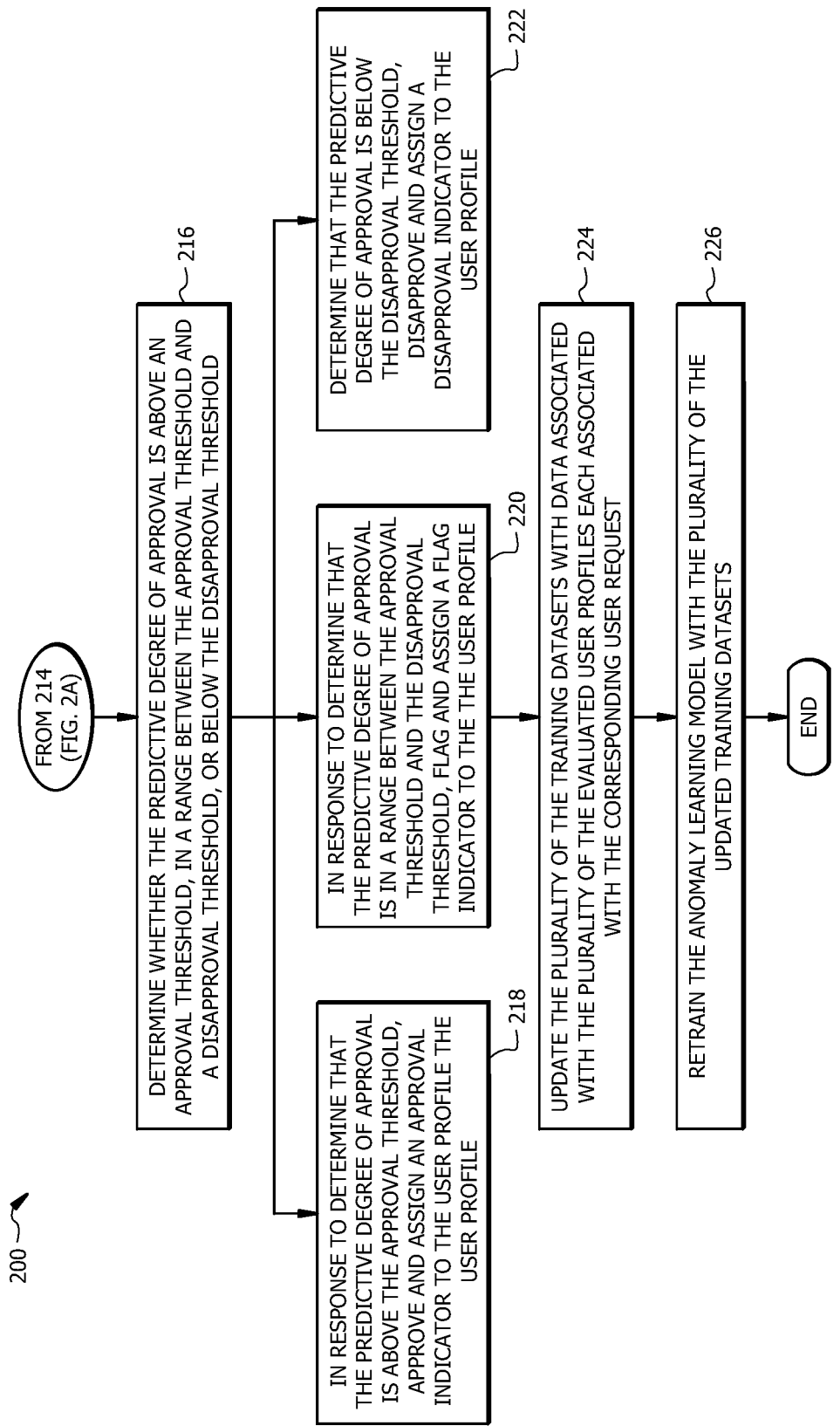
FIG. 2B illustrates an example continuation flow of the example operational flow of a method from FIG. 2A for evaluating the predicted results of the user profiles and retraining an anomaly learning model.

As described above, previous technologies fail to provide efficient and reliable solutions to predict anomalous requests for preventing anomalous user interactions with the entity in a network. This disclosure provides various systems and methods to predict an anomalous request for preventing an anomalous user interaction with the entity in a network. FIG. 1 illustrates an embodiment of a system configured to predict an anomalous request according to an illustrative embodiment of the present disclosure. FIG. 2A illustrates an example operational flow of the method 200 for processing user profiles and predicting anomalous requests. FIG. 2B illustrates an example continuation flow of the example operational flow of the method 200 from FIG. 2A for evaluating the predicted results of the user profiles and retraining an anomaly learning model.

Example System for Predicting Anomalous Interactions in a Network

FIG. 1 illustrates one embodiment of a system 100 that is configured to predict anomalous requests in a network 110. In one embodiment, system 100 comprises a server 140. In some embodiments, system 100 further comprises a network 110, computing device 120, and one or more databases 130. Network 110 enables the communication between components of the system 100. Server 140 comprises a processor 142 in signal communication with a memory 148. Memory 148 stores software instructions 150 that when executed by the processor 142, cause the processor 142 to execute one or more functions described herein. For example, when the software instructions 150 are executed, the processor 142 executes an anomaly detection engine 144 to process user profiles and predict anomalous requests for preventing anomalous interactions in the network. In other embodiments, system 100 may not have all the components listed and/or may have other elements instead of, or in addition to, those listed above.

System Components

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. The hardware processor may include one or more processors operably coupled to the memory. The one or more processors may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors may be a programmable logic device, a microcontroller, a microprocessor, or any suitable combination of the preceding. The one or more processors are configured to process data and may be implemented in hardware or software. For example, the processor may be 8-bit, 16-bit, 32-bit, 64-bit, or of any other suitable architecture. The processor may include an arithmetic logic unit (ALU) for performing arithmetic and logic operations. For example, a software application designed using software code may be stored in the memory and executed by the processor to perform the functions of the computing device 120.

The computing device 120 stores and/or includes the application 122. The application 122 may be a software, mobile, or web application 122. Application 122 can be accessed from the computing device 120. The application 122 may be associated with an organization entity that provides services and/or products to users 102. Application 122 may be generally configured to receive user requests and user profiles, create user account login credentials to the application 122 to allow the user 102 to access their user profile 168 via their computing device 120 upon an approval of the organization entity. The user profile 168 may be stored in one or more databases communicatively coupled with the components of the system 100. For example, after the user profile 168 is approved by the server 140, a user 102 may create their login credentials to the application 122. The user 102 may access their user profile 168 by providing their login credentials to the application 122. A server associated with the application 122 (e.g., server 140) may be configured to evaluate whether the provided login credentials are valid based on comparing the provided login credentials with login credentials previously set by the user 102 and stored in a memory, e.g., memory 148. Upon validating the login credentials, the user 102 may access their user profile and profile data stored in their user profiles 168.

Databases or data sources 130a, 130b, and 130c may be a remote database, a cloud database, or an on-site internal database. Data sources 130a to 130c may be coupled to or in communication with and accessed by the server 140 via the network 110. In some examples, the data source 130a may be an internal database and store information relating to the approved data 132a associated with one or more user profiles that are currently approved by the organization entity. The data source 130b may be an external database and store information relating to audit data 132b which is associated with one or more user profiles registered with one or more third party sources. The data source 130c may be an external database and store information relating to anomalous or disapproved data 132c which has been disapproved by the organization entity and is identified by one or more third party sources.

Server

Server 140 is generally a server, or any other device configured to process data and communicate with computing devices (e.g., computing device 120), databases or data sources 130, etc., via the network 110. The server 140 is generally configured to oversee the operations of the anomaly detection engine 144, as described further below in conjunction with the operational flows of the method 200 described in FIGS. 2A and 2B. The server 140 may be a central server implemented in the cloud and may also be organized in a distributed manner.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the detection engine 144. In this way, the processor 142 may be a special-purpose computer designed to implement the functions disclosed herein. In one embodiment, the processor 142 is implemented using logic units, FPGAs, ASICs, DSPs, or any other suitable hardware. The processor 142 is configured to operate to perform one or more operations as described in FIGS. 2-3.

Network interface 146 is configured to enable wired and/or wireless communications (e.g., via network 110). The network interface 146 is configured to communicate data between the server 140 and other devices (e.g., computing device 120), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, training datasets 160, historical user profiles 162, communication data 164 including requests 166 and user profiles 168, data objects 170, anomaly data indicators 172, vectors 174, profile indicators 176, predictive degrees of approval 178, and/or any other data or instructions. The software instructions 150 may store any suitable set of instructions, logic, rules, or code operable to be executed by the processor 142 to implement the processes and embodiments described below. In an example operation, the memory may store a user interface application 152, data processing model 154, natural language processing (NPL) algorithm 156, anomaly learning model 158, and other program modules which are implemented in computer-executable software instructions. The software instructions 150 may include one or more the machine learning models executed by the processor 142 to implement operational flows of the system of FIG. 1. The machine learning models may be one or more algorithms including support vector machine, neural network, random forest, k-means clustering, etc. The machine learning models may be implemented by a plurality of neural network (NN) layers, Convolutional NN (CNN) layers, Long-Short-Term-Memory (LSTM) layers, Bi-directional LSTM layers, Recurrent NN (RNN) layers, and the like.

Anomaly Detection Engine

Anomaly detection engine 144 may include, but is not limited to, one or more separate and independent software and/or hardware components of a server 140. In some embodiments, the anomaly detection engine 144 may be implemented by the processor 142 by executing the software instructions 150 to execute the user interface application 152, data processing model 154, NPL algorithm 156, and anomaly learning model 158 to process user profiles in response to user requests for predicting anomalous requests and preventing anomalous interactions with the server 140 associated with an organization entity. The anomaly detection engine 144 may execute the anomaly learning model 158 by executing the software instructions 150 in parallel or after one or more other software models as described above, e.g., user interface application 152, data processing model 154, and NPL algorithm 156. The operation of the disclosed system 100 is described below.

Receiving Communication Data for Creating User Profiles

In one embodiment, the operation begins when the user 102 requests for creating a user profile to interact with a server 140, logging in and accessing their user profile 168, performing an action on their profile 168, or any other task on the application 122. To enable the user 102 to perform a task on the application 122 to interact with the server 140 associated with the organization entity, one or more operations may be performed by the server 140 in the system 100. A user 102 can access the application 122 from a display of the computing device 120 to request to create a user profile 168 for interacting with the organization entity and accessing services provided by the server 140. In an example operation, the user interface application 152 is executed by the processor 142 to allow the user 102 to enter their profile portal on the application 122. The user 102 may input their profile information as communication data 164 and send a request 166 to create user profiles 168 for accessing the server 140 via the network 110. The server 140 may receive communication data 164 including requests 166 and user profiles 168 for creating user profiles from computing devices 120 associated with users 102 over the network 110. The server 140 may receive the communication data 164 including the request 166 in real-time, periodically (e.g., every five seconds, every minute, every two minutes, etc.), and/or on-demand (e.g., triggered when receipt of a request 166 is detected). The user profile 168 may comprise one or more of a user identifier, username, physical address, email address, phone number, generic domain name, a public Internet protocol (IP) address and any other data associated with the user account, such as documents, files, media items, etc. The plurality of user profiles 168 may be stored by the processor 142 in the memory 148.

Processing User Profiles to Generate Corresponding User Objects

The anomaly detection engine 144 may be implemented by the processor 142 executing the data processing model 154 to process each user profile 168 to generate a set of data objects 168. For example, each user profile 168 may comprises at least one of data objects 170 associated with a user identifier, an email address, a physical address, a public Internet protocol (IP) address and a generic domain. The data processing model 154 may be executed by the processor 142 to execute the software instructions 150 to parse the user profile 168 to generate a set of data objects 170 associated with user profile 168. The data objects 170 may be formed as natural language text elements, codes and among others. The natural language text elements may include words, phrases, etc. The use profiles 168 in the incoming communication data 164 may be processed by the processor 142 to generate a plurality of sets of data objects 170.

In one embodiment, the data processing model 154 may be executed by the processor 142 to access the data sources 130a-130c and retrieve data related to one or more of the data objects 170 associated with the user profile 168.

Determine Anomalous Data Indicators Associated with Data Objects Based on Anomalous Patterns The data processing model 154 may be executed by the processor 142 to analyze and compare the set of data objects associated with the user profile 168 with data retrieved from one or more third party sources and to determine corresponding anomalous data indicators associated with the data objects 170 for the user profile 168. In one embodiment, the data processing model 154 may be executed to generate the anomalous data indicators for the user profile by determining whether the one or more data objects match one or more counterpart data objects of the date retrieved from the one of more data sources.

In one embodiment, the data processing model 154 may include a machine learning algorithm 155 executed by the processor 142 to identify a set of anomalous patterns associated with one or more data objects of the user profile 168. For example, the machine learning algorithm 155 may be trained to learn the anomalous patterns based on the data objects associated with historical user profiles 162. The historical user profiles 162 are stored in the memory 148 and are associated with evaluated use profiles. The historical user profiles 162 comprise a plurality of sets of data objects and corresponding profile indicators 176. The profile indicator is indicative of whether the user profile is approved, flagged, or disapproved. The profile indicator may be one of an approval indicator, a flag indicator, and a disapproval indicator. The anomalous patterns associated with the historical user profiles 162 may be learned and identified by training the machine learning algorithm 155 with data objects of the historical user profiles 162 based on a state with a high fraud rate, an identifier recognition, a physical address recognition, an email address recognition, a public Internet protocol (IP) address recognition and a generic domain recognition.

The processor 142 may implement the machine learning algorithm 155 to process the data objects 170 and one or more counterpart data objects of the retrieved data based on the anomalous patterns to determine the corresponding anomalous data indicators 172. For example, the anomalous patterns may be identified by the processor 142 by comparing the one or more data objects with one or more counterpart data objects of the retrieved data. The processor 142 may execute the anomaly detection engine 144 and/or the data processing model 154, and feed the set of data objects 170 and the retrieved data to the NPL algorithm 156 to produce a first set of vectors 174 associated with the set of the data objects 170 and a second set of vectors 174 associated with the data retrieved from one or more data sources. The processor 142 may implement the machine learning algorithm 155 based on the anomalous patterns to perform vector comparison between the first set of the vectors and the second set of the vectors to generate the anomalous data indicators 172 for the set of data objects. Each anomalous data indicator 172 may be a unique alphanumeric value. The anomalous data indicators may represent a correlation and similarity measure between the set of the data objects and one or more counterpart data objects of the retrieved data from the one or more data sources 130a to 130c.

Training an Anomaly Learning Model to Generate a Predictive Degree of Approval Associated with User Requests The corresponding description below describes a brief explanation of the operations of the anomaly learning model 158.

In a training process, the anomaly detection engine 144 may be executed by the processor 142 to process the historical user profiles 162 to generate training datasets 160. The training datasets 160 comprise a plurality of sets of data objects and corresponding profile indicators associated with the evaluated data profiles. The plurality of sets of the data objects include corresponding anomalous data indicators that may be determined based on the processes as described above. The anomaly detection engine 144 may be implemented by the processor 142 to feed the training datasets 160 to and train the anomaly learning model 158 to determine a predictive degree of approval 178 for each user profile 168.

The process of predicting anomalous requests is described in detail in conjunction with the operational flows of the methods 200 illustrated in FIGS. 2A and 2B.

Example Operational Flow for Predicting Anomalous Requests to Prevent Anomalous Interactions FIG. 2A illustrates an example flow of a method 200 for detecting predicting anomalous requests in the system 110.

Modifications, additions, or omissions may be made to method 200. Method 200 may include more, fewer, or other operations. For example, operations may be performed by the server 140 in parallel or in any suitable order. While at times discussed as the system 100, processor 142, anomaly detection engine 144, user interface application 152, data processing model 154, NPL algorithm 156, anomaly learning model 158, or components of any of thereof performing operations, any suitable system or components of the system may perform one or more operations of the method 200. For example, one or more operations of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 202-214.

The anomaly detection engine 144 (e.g., via the user interface application 152) is executed by the processor 142 to receive incoming communication data 164 including a request 166 and a user profile 168. The communication data 164 is transmitted to the server 140 from the user computing device 120 via the network 110. The server may receive a plurality of user profiles 168 and store them in the memory 148. In response, the anomaly detection engine 144 is triggered to be executed by the processor 142 to analyze the user profile 168 associated with the request 166 and predict whether the request 166 is anomalous and further prevent anomalous interactions with the organization entity.

The method 200 begins at operation 202 where the processor 142 executes the anomaly detection engine 144 via the data processing model 154 to parse a first user profile 168 from the plurality of user profiles to generate a first set of data objects associated with the first user profile. Each user profile comprises at least one of data objects associated with a user identifier, an email address, a physical address, a public Internet protocol (IP) address and a generic domain.

At operation 204, the processor 142 executes the anomaly detection engine 144 via the data processing model 154 to compare the first set of the data objects to approved data 132a retrieved from a first data database 130a to determine a first set of anomalous data indicators. The approved data 132a may be associated with one or more counterpart data objects of one or more user profiles that are currently approved by the entity. In one embodiment, the processor 142 may execute the machine learning algorithm 155 based on the anomalous patterns to compare the first set of the data objects to the one or more counterpart data objects of approved data 132a to determine the first set of the anomalous data indicators for the first set of data objects. The first set of the anomalous data indicators are each indicative of a first anomalous relevance measure between the first set of the data objects and the approved data 132a.

At operation 206, the processor 142 executes the anomaly detection engine 144 via the data processing model 154 to compare the first set of the data objects to audit data 132b retrieved from a second database 130b to determine a second set of anomalous data indicators. The audit data 132b may be associated with one or more counterpart data objects of one or more user profiles registered with one or more third party sources. In one embodiment, the processor 142 may execute the machine learning algorithm 155 based on the anomalous patterns to compare the first set of the data objects to the one or more counterpart data objects of audit data 132b to determine the second set of the anomalous data indicators for the set of data objects. The second set of the anomalous data indicators are each indicative of a second anomalous relevance measure between the first set of the data objects and the audit data 132b.

At operation 208, the processor 142 executes the anomaly detection engine 144 via the data processing model 154 to compare the first set of the data objects to disapproved data 132c retrieved from a third database 130c to determine a third set of anomalous data indicators. The disapproved data 132c may include one or more counterpart data objects of anomalous data identified by one or more third party sources. In one embodiment, the processor 142 may execute the machine learning algorithm 155 based on the anomalous patterns to compare the first set of the data objects to the one or more of the counterpart data objects of anomalous data to determine the third set of anomalous data indicators for the set of data objects. The third set of the anomalous data indicators are each indicative of a third anomalous relevance measure between the first set of the data objects and the disapproved data.

At operation 210, the processor 142 executes the anomaly detection engine 144 via the data processing model 154 to generate a second set of data objects associated with the first user profile. The second set of the data objects include a first set of the anomalous data indicators, the second set of the anomalous data indicators, the third set of the anomalous data indicators and the first set of the data objects.

At operation 212, the processor 142 executes the anomaly detection engine 144 through an anomaly learning model 158 to process the second set of the data objects to determine a predictive degree of approval 178 for the first user profile. A predictive degree of approval 178 may have a numerical percentage value, such as 70%, 80%, or 90%. The anomaly learning model 158 may be trained with the training datasets 160 associated with the evaluated historical user profiles 162 as described above. A predictive degree of approval 178 may be determined for each corresponding user profile from the plurality of user profiles.

At operation 214, the processor 142 executes the anomaly detection engine 144 through the anomaly learning model 158 to determine to approve, flag or disapprove the first user profile based on the predictive degree of approval 178. The processor 142 may determine to approve, flag or disapprove each corresponding user profile from the plurality of user profiles based on the corresponding predictive degree of approval 178.

Evaluate User Profiles Based on Predictive Degrees of Approval

FIG. 2B illustrates a continuation flow of the operational flow 200 from FIG. 2A. The example continuation flow 200 from FIG. 2B shows a method to evaluate user profiles associated with user requests and retrain the anomaly learning model in the system 100. Modifications, additions, or omissions may be made to the continuation flow 200 from FIG. 2B. The continuation flow 200 from FIG. 2B may include more, fewer, or other operations. For example, operations may be performed in parallel or in any suitable order. While at times discussed as the system 100, processor 142, anomaly detection engine 144, user interface application 152, data processing model 154, NPL algorithm 156, anomaly learning model 158, or components of any of thereof performing operations, any suitable system or components of the system may perform one or more operations of the method 200. For example, one or more operations of the continuation flow 200 from FIG. 2B may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 216-226. The anomaly learning model 158 may be executed to evaluate the predictive degree of approval 178 and determine to approve, flag, or disapprove the user profile 168.

At operation 216, the processor 142 executes the anomaly detection engine 144 via the anomaly learning model 158 to determine whether the predictive degree of approval 178 determined for the first user profile is above an approval threshold, in a range between the approval threshold and a disapproval threshold, or below the disapproval threshold.

At operation 218, the processor 142 executes the anomaly learning model 158 to determine to approve the user profile and assign an approval indicator to the first user profile in response to determining that the predictive degree of approval is above the approval threshold. For example, the processor 142 executes the anomaly detection engine 144 to create the user profile 168 and send an email or textual message to the user via the network 110 to notify the user 102 of the account approval. Further, the processor 142 allows the user to open an account for the approved user profile 168, create login credentials to interact with the server 140, perform an action on the user profile 168 or conduct any other tasks on the application 122 via the computing device 120.

At operation 220, the processor 142 executes the anomaly learning model 158 to determine to flag the first user profile and assign a flag indicator to the user profile in response to determining that the predictive degree of approval is in a range between the approval threshold and the disapproval threshold. The processor 142 may execute the anomaly detection engine 144 to flag or hold to process the first user profile, send an alert notice to the user via the network 110, or require more information for further evaluation.

At operation 222, the processor 142 executes the anomaly detection engine 144 to determine to disapprove the first user profile and assign a disapproval indicator to the first user profile in response to determining that the predictive degree of approval is below the disapproval threshold. The processor 142 may execute the anomaly detection engine 144 to disapprove the request and send an electronic closure notice to the user via the network 110.

At operation 224, the processor 142 executes the anomaly detection engine 144 via the data processing model 154 to update the plurality of the training datasets 160 with data associated with the newly evaluated user profiles. For example, the processor 142 generates a corresponding second set of data objects, determines a predictive degree of approval 178 and a corresponding profile indicator 176 for a second user profile 168. The profile indicators 176 are assigned to the plurality of user profiles each corresponding to a request 166. The processor 142 updates the plurality of the training datasets 160 with the corresponding second set of the data objects, predictive degrees of approval 178 and profile indicators 176 of each user profile 168.

In this manner, the anomaly detection engine 144 may be executed by the processor 142 to add the corresponding second set of the data objects and profile indicator each associated with the evaluated data profiles 168 to the training datasets 160 and grow the training datasets 160.

At operation 226, the processor 142 executes the anomaly detection engine 144 to retrain the anomaly learning model 158 with the plurality of the updated training datasets 160 for generating predictive degrees of approval 178 and profile indicators 176 for predicting anomalous requests more accurately in the network 110.

In some embodiments, the anomaly learning model 158 may be deployed into one of the components of the anomaly detection engine 144 of the server 140. The server 140 may receive and process communication data 164 including user requests 166 and user profiles 168, and predict anomaly requests associated with the user requests 166 in real time.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory operable to store:
     a plurality of user profiles each associated with a corresponding user request to be approved to interact with an entity; and
     an anomaly learning model configured to predict an anomalous request for preventing an anomalous user interaction with the entity; and
   a processor operably coupled to the memory, the processor configured to:
     parse a first user profile from the plurality of user profiles to generate a first set of data objects associated with the first user profile;
     compare the first set of the data objects to approved data retrieved from a first database to determine a first set of anomalous data indicators, wherein the approved data is associated with one or more user profiles that are currently approved by the entity, the first set of the anomalous data indicators each indicating a first anomalous relevance measure between the first set of the data objects and the approved data;
     compare the first set of the data objects to audit data retrieved from a second database to determine a second set of anomalous data indicators, wherein the audit data is associated with one or more user profiles registered with one or more third party sources, the second set of the anomalous data indicators each indicating a second anomalous relevance measure between the first set of the data objects and the audit data;
     generate a second set of data objects associated with the first user profile, the second set of the data objects comprising the first set of anomalous data indicators, the second set of anomalous data indicators, and the first set of the data objects;
     process the second set of the data objects through the anomaly learning model to determine a predictive degree of approval associated with the first user profile; and
     determine to approve, flag, or disapprove the first user profile based on the predictive degree of approval.

2. The system of claim 1, wherein the processor is further configured to determine
   whether the predictive degree of approval is above an approval threshold, in a range between the approval threshold and a disapproval threshold, or below the disapproval threshold.

3. The system of claim 2, wherein the processor is further configured to:
   determine to approve the first user profile and assign an approval indicator to the first user profile in response to determining that the predictive degree of approval is above the approval threshold;
   determine to flag the first user profile and assign a flag indicator to the first user profile in response to determining that the predictive degree of approval is in a range between the approval threshold and the disapproval threshold; and
   determine to disapprove the first user profile and assign a disapproval indicator to the first user profile in response to determining that the predictive degree of approval is below the disapproval threshold.

4. The system of claim 1, wherein:
   the memory is further configured to store a plurality of training datasets, wherein each training dataset is associated with a corresponding evaluated data profile that is currently approved, flagged or disapproved by the entity, and each training dataset comprises a corresponding second set of the data objects, a predictive degree of approval, and a profile indicator being assigned to each evaluated user profile, the profile indicator comprising one of an approval indicator, a flag indicator, and a disapproval indicator; and
   the processor is further configured to:
   train the anomaly learning model with the plurality of the training datasets based on a set of the anomalous patterns;
   generate a corresponding second set of data objects for a second user profile and determine a corresponding profile indicator for a second user profile;
   update the plurality of the training datasets with the second set of the data objects, and the profile indicator each assigned to the first user profile and the second user profile respectively; and
   retrain the anomaly learning model with the plurality of the updated training datasets.

5. The system of claim 4, wherein each user profile comprises at least one of data objects associated with a user identifier, an email address, a physical address, a public Internet protocol (IP) address and a generic domain.

6. The system of claim 5, wherein the processor is further configured to determine each anomalous data indicator by identifying a set of anomalous patterns associated with one or more of the first set of the data objects; and wherein each anomalous data indicator is a unique alphanumeric value, and the set of the anomalous patterns are identified based on a state with a high fraud rate, an identifier recognition, a physical address recognition, an email address recognition, a public Internet protocol (IP) address recognition and a generic domain recognition.

7. The system of claim 6, wherein:
the first anomalous relevance measure represents a correlation and similarity measure between the first set of the data objects and the approved data based on the set of the anomalous patterns; and
the second set of the anomalous relevance measure represents a correlation and similarity measure between the first set of the data objects and the audit data relevance measure based on the set of the anomalous patterns.

8. A method for predicting an anomalous request in a network, comprising:
parsing a first user profile from the plurality of user profiles to generate a first set of data objects associated with the first user profile;
comparing the first set of the data objects to approved data retrieved from a first database to determine a first set of anomalous data indicators, wherein the approved data is associated with one or more user profiles that are currently approved by the entity, the first set of the anomalous data indicators each indicating a first anomalous relevance measure between the first set of the data objects and the approved data;
comparing the first set of the data objects to audit data retrieved from a second database to determine a second set of anomalous data indicators, wherein the audit data is associated with one or more user profiles registered with one or more third party sources, the second set of the anomalous data indicators each indicating a second anomalous relevance measure between the first set of the data objects and the audit data;
generating a second set of data objects associated with the first user profile, the second set of the data objects comprising the first set of anomalous data indicators, the second set of anomalous data indicators, and the first set of the data objects;
processing the second set of the data objects through an anomaly learning model to determine a predictive degree of approval associated with the first user profile; and
determining to approve, flag, or disapprove the first user profile based on the predictive degree of approval.

9. The method of claim 8, further comprising determining whether the predictive degree of approval is above an approval threshold, in a range between the approval threshold and a disapproval threshold, or below the disapproval threshold.

10. The method of claim 9, further comprising:
determining to approve the first user profile and assign an approval indicator to the first user profile in response to determining that the predictive degree of approval is above the approval threshold;
determining to flag the first user profile and assign a flag indicator to the first user profile in response to determining that the predictive degree of approval is in a range between the approval threshold and the disapproval threshold; and
determining to disapprove the first user profile and assign a disapproval indicator to the first user profile in response to determining that the predictive degree of approval is below the disapproval threshold.

11. The method of claim 8, further comprising:
storing a plurality of training datasets in a memory of a computing device, wherein each training dataset is associated with a corresponding evaluated data profile that is currently approved, flagged or disapproved by the entity, and each training dataset comprises a corresponding second set of the data objects, a predictive degree of approval, and a profile indicator being assigned to each evaluated user profile, the profile indicator comprising one of an approval indicator, a flag indicator, and a disapproval indicator;
training the anomaly learning model with the plurality of the training datasets based on a set of the anomalous patterns;
generating a corresponding second set of data objects and determining a corresponding profile indicator for a second user profile;
updating the plurality of the training datasets with the second set of the data objects, and the profile indicator each assigned to the first user profile and the second user profile respectively; and
retraining the anomaly learning model with the plurality of the updated training datasets.

12. The method of claim 11, wherein each user profile comprises at least one of data objects associated with a user identifier, an email address, a physical address, a public Internet protocol (IP) address and a generic domain.

13. The method of claim 12, further comprising determining each anomalous data indicator by identifying the set of anomalous patterns associated with one or more of the first set of the data objects; and wherein each anomalous data indicator is a unique alphanumeric value, and the set of the anomalous patterns are identified based on a state with a high fraud rate, an identifier recognition, a physical address recognition, an email address recognition, a public Internet protocol (IP) address recognition and a generic domain recognition.

14. The method of claim 13, wherein:
the first anomalous relevance measure represents a correlation and similarity measure between the first set of the data objects and the approved data based on the set of the anomalous patterns; and
the second set of the anomalous relevance measure represents a correlation and similarity measure between the first set of the data objects and the audit data relevance measure based on the set of the anomalous patterns.

15. A non-transitory computer-readable medium storing instructions that when executed by a processor, cause the processor to:
parse a first user profile from the plurality of user profiles to generate a first set of data objects associated with the first user profile;
compare the first set of the data objects to approved data retrieved from a first database to determine a first set of anomalous data indicators, wherein the approved data is associated with one or more user profiles that are currently approved by the entity, the first set of the anomalous data indicators each indicating a first anomalous relevance measure between the first set of the data objects and the approved data;
compare the first set of the data objects to audit data retrieved from a second database to determine a second set of anomalous data indicators, wherein the audit data is associated with one or more user profiles registered with one or more third party sources, the second set of the anomalous data indicators each indicating a second anomalous relevance measure between the first set of the data objects and the audit data;

generate a second set of data objects associated with the first user profile, the second set of the data objects comprising the first set of anomalous data indicators, the second set of anomalous data indicators, and the first set of the data objects;

process the second set of the data objects through an anomaly learning model to determine a predictive degree of approval associated with the first user profile; and determine to approve, flag, or disapprove the first user profile based on the predictive degree of approval.

16. The non-transitory computer-readable medium of claim 15, wherein the instructions when executed by the processor further cause the processor to determine whether the predictive degree of approval is above an approval threshold, in a range between the approval threshold and a disapproval threshold, or below the disapproval threshold.

17. The non-transitory computer-readable medium of claim 16, wherein the instructions when executed by the processor further cause the processor to:

determine to approve the first user profile and assign an approval indicator to the first user profile in response to determining that the predictive degree of approval is above the approval threshold;

determine to flag the first user profile and assign a flag indicator to the first user profile in response to determining that the predictive degree of approval is in a range between the approval threshold and the disapproval threshold; and determine to disapprove the first user profile and assign a disapproval indicator to the first user profile in response to determining that the predictive degree of approval is below the disapproval threshold.

18. The non-transitory computer-readable medium of claim 15, wherein the instructions when executed by the processor further cause the processor to:

store a plurality of training datasets, wherein each training dataset is associated with a corresponding evaluated data profile that is currently approved, flagged or disapproved by the entity; and wherein each training dataset comprises a corresponding second set of the data objects, a predictive degree of approval, and a profile indicator being assigned to each evaluated user profile, the profile indicator comprising one of an approval indicator, a flag indicator, and a disapproval indicator;

train the anomaly learning model with a plurality of the training datasets based on a set of the anomalous patterns;

generate a corresponding second set of data objects and determine a corresponding profile indicator for a second user profile;

update the plurality of the training datasets with the second set of the data objects, and the indicator each assigned to the first user profile and the second user profile respectively; and retrain the anomaly learning model with the plurality of the updated training datasets.

19. The non-transitory computer-readable medium of claim 18, wherein each user profile comprises at least one of data objects associated with a user identifier, an email address, a physical address, a public Internet protocol (IP) address and a generic domain.

20. The non-transitory computer-readable medium of claim 19, wherein the instructions when executed by the processor further cause the processor to determine each anomalous data indicator by identifying a set of anomalous patterns associated with one or more of the first set of data objects; and wherein the set of the anomalous patterns are associated with identified based on a state with a high fraud rate, an identifier recognition, a physical address recognition, an email address recognition, a public Internet protocol (IP) address recognition and a generic domain recognition;

each anomalous data indicator is a unique alphanumeric value;

the first anomalous relevance measure represents a correlation and similarity measure between the first set of the data objects and the approved data based on the set of the anomalous patterns; and the second set of the anomalous relevance measure represents a correlation and similarity measure between the first set of the data objects and the audit data relevance measure based on the set of the anomalous patterns.

* * * * *